United States Patent [19]

Kobashi

[11] 4,014,171

[45] Mar. 29, 1977

[54] HYDRAULIC BRAKE BOOSTER

[75] Inventor: Uichiro Kobashi, Okazaki, Japan

[73] Assignee: Aisin Seiki Co., Ltd., Japan

[22] Filed: June 10, 1975

[21] Appl. No.: 585,682

[30] Foreign Application Priority Data

June 10, 1974 Japan .............................. 49-65047

[52] U.S. Cl. ..................................... 60/547; 91/31; 91/376 R

[51] Int. Cl.$^2$ ......................................... F15B 7/00

[58] Field of Search ............ 60/547, 582, 404, 405; 91/170 R, 173, 31, 6, 376; 92/65

[56] References Cited

UNITED STATES PATENTS

| | | | |
|---|---|---|---|
| 3,712,057 | 1/1973 | Aiki | 60/547 |
| 3,834,277 | 9/1974 | Yabuta et al. | 91/376 |
| 3,926,093 | 12/1975 | Nakagawa | 60/547 X |

Primary Examiner—William R. Cline
Attorney, Agent, or Firm—Oblon, Fisher, Spivak, McClelland & Maier

[57] ABSTRACT

A hydraulic brake booster includes a housing having a bore therein, a stepped power piston slidably disposed within the bore and forming at one side thereof a fluid chamber, a first passage communicating with a fluid pressure source, a second passage communicating with the fluid chamber, a third passage communicating with a reservoir, a first valve normally interrupting the communication between the first passage and the fluid chamber, and a second valve for controlling the communication between the fluid chamber and the third passage.

The first passage is provided within the small diameter portion of the stepped power piston for reducing the sliding resistance force exerted upon the stepped power piston during the sliding movement thereof.

9 Claims, 1 Drawing Figure

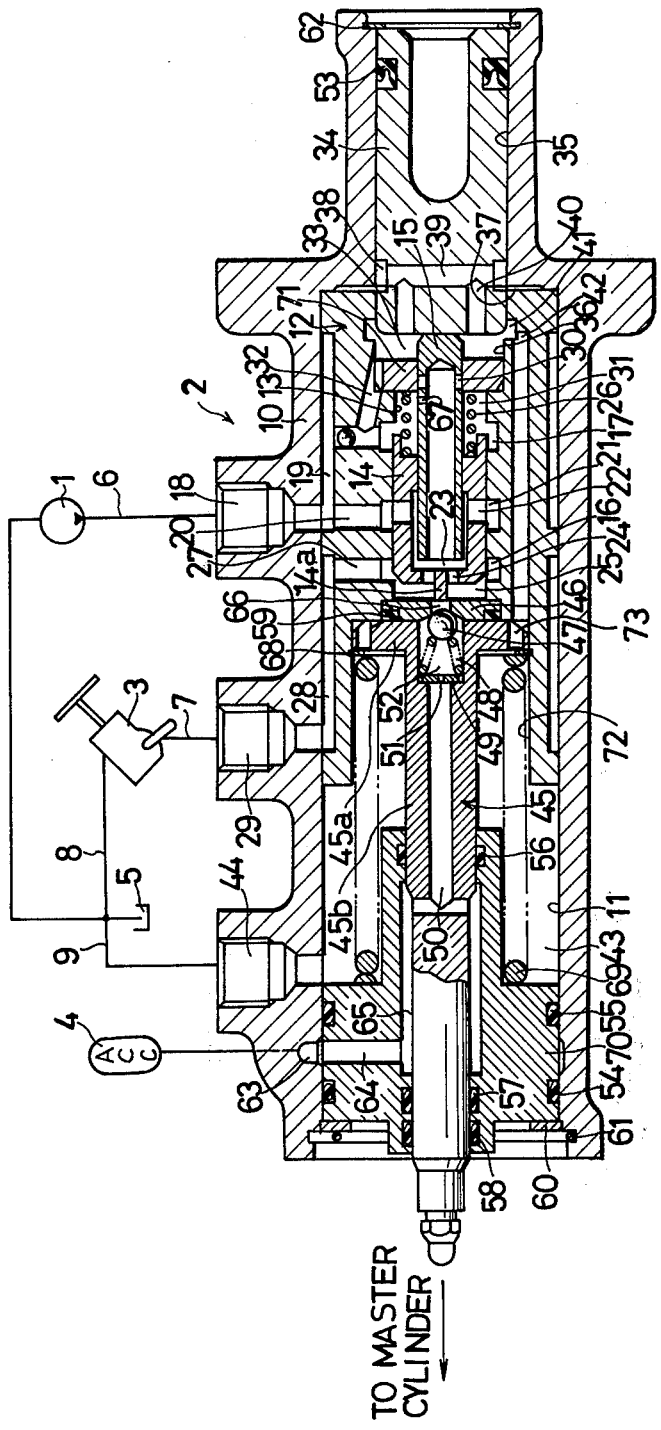

HYDRAULIC BRAKE BOOSTER

BACKGROUND OF THE INVENTION

1. Field of the Invention

The present invention relates generally to hydraulic booster units and more particularly to a hydraulic brake booster unit adapted for use in a vehicle.

2. Description of the Prior Art

Within the prior art boosters, especially of the closed center type, fluid from a power source has been permitted to flow into a booster housing through means of an annular grooved chamber provided at the outer peripheral surface of a power piston. One such conventional construction is illustrated within U.S. Pat. No. 2,883,971 wherein a high pressure fluid is fed from an accumulator 34 into an annular chamber 32 provided at the outer periphery of a power piston 28, and further to a normally closed valve assembly 61 and 54, as shown within FIG. 1. This method of introducing fluid into a booster unit, however, has a serious drawback.

As the power piston 28 has seal members 30 for sealing the high pressure within the annular chamber 32 of the power piston 28, these seals 30, two being shown, must have a diameter approximately the same as that of the power piston, especially that of the piston body 29, and accordingly, the cross-sectional diameter thereof must be increased relative to the whole diameter thereof for attaining sufficient sealing. Since the piston 28 is slidable or reciprocable, the cross-sectional diameter of seals 30 must, however, be reduced as much as possible in order to minimize the sliding resistance force exerted upon the piston 28 for smooth sliding of the same.

Another prior art booster is disclosed within U.S. Pat. No. 3,792,641, has apparently solved such sealing problems. A high pressure fluid from a pump is permitted to flow into one side of a closed valve 46 through means of an annular groove 22 provided at the outer peripheral surface of an input piston 20. Since the diameter of the input piston 20 is smaller than that of a power piston 68, the diameter of the seals upon the input piston 20 may be, in this sense, reduced by a certain amount. However, the sliding resistance force exerted upon the input piston 20 is directly transmitted to a pedal 106, that is, the whole sliding resistance force is transmitted to a pedal, and the operator, as the resistance force.

SUMMARY OF THE INVENTION

Accordingly, in accordance with the present invention, since the seals are provided upon the power piston 12, and especially upon the small diameter portion 45 thereof, the sliding resistance force exerted upon the power piston is transmitted to the input piston with a reduced value which may generally be represented as follows:

$$fp/A_p = fi/Ai$$

wherein:
 $fp$ is the sliding resistance force exerted upon the power piston;
 $Ap$ is the cross-sectional area of the power piston;
 $fi$ is the reaction force exerted upon the input piston; and
 $Ai$ is the cross-sectional area of the input piston.

Assuming now that $Ap$ is 4 and $Ai$ is 1, then the above formula is replaced by following:

$$fi = 1/4 fp$$

Thus, compared with the aforementioned secondly noted prior art, if the seals are provided upon the power piston, the sliding resistance force transmitted to the input piston will be considerably decreased resulting in a smooth and pleasant pedal operation.

Compared to the prior art, the present invention may thus solve the aforenoted sealing difficulties. In accordance with the present invention, high pressure fluid from an accumulator 4 is permitted to flow into one side 52 of a closed valve 46 and 47 through a central bore 50 of a small diameter portion 45 of a power piston 12 instead of through the annular groove 31 of the aformentioned prior art (U.S. Pat. No. 2,883,971). Since the diameter of the portion 45 is approximone quarter that of the piston body 12, the diameter of the seals 56-58, as well as the cross-sectional diameter thereof, is accordingly reduced in relation to the small diameter of the portion 45, and in fact, the cross-sectional diameter of the seals 56-58 within this instance may be reduced to a value of two thirds as compared to the seals assumed to be provided upon the power piston body 12, according to the design technique.

The illustrated embodiment of the present invention is somewhat specific in that the high pressure fluid from the accumulator 4 is utilized only upon difficulty being experienced within the pump 1, such as for example, when the fluid from the pump 1 is not delivered into the booster through means of the port 18.

BRIEF DESCRIPTION OF THE DRAWING

Various other objects, features, and attendant advantages of the present invention will be more fully appreciated as the same becomes better understood from the following detailed description when considered in connection with the accompanying drawing, wherein:

The sole FIGURE is a longitudinal cross-sectional view of a hydraulic booster, within its released position, constructed in accordance with the present invention and showing its cooperative parts.

DETAILED DESCRIPTION OF A PREFERRED EMBODIMENT

Referring now to the drawing, a fluid pump 1 is driven by means of an engine, not shown, of the vehicle, and the pump 1 is hydraulically connected with a booster unit, generally indicated by the reference character 2 and a power steering unit 3 for hydraulically actuating the same. The booster unit 2 comprises a housing 10 having a stepped cylindrical bore provided therein, the large diameter bore portion 11 having a power piston 12 slidably disposed therein, while the small diameter bore portion 35 similarly has an input piston 34 slidably disposed therein. The large diameter bore portion 11 of the housing 10 is divided into two chambers 37 and 43 defined upon opposite sides of the power piston 12, and the input piston 34 is mechanically connected with a brake pedal, not shown, of the vehicle.

The booster housing 10 is further provided with four ports 18, 29, 44 and 63 which communicates with the large diameter bore 11 of the housing 10, wherein port 18 is fluidically connected with the pump 1 through means of a conduit 6 while port 29 is likewise connected with the power steering unit 3 through means of a conduit 7. Port 44 is similarly connected with a reservoir 5 through means of a conduit 9, and port 63 is fluidically connected with an accumulator 4.

The power piston 12 is provided with a pair of annular grooves 19 and 28 upon the outer peripheral surface thereof, and the first annular groove 19 fluidically communicates with port 18 of housing 10 while the second annular groove 28 similarly communicates with port 29. The power piston 12 is further provided with a stepped cylindrical bore therein so as to define a large diameter bore portion 36 for receiving the left end of the input piston 34, and a small diameter bore portion 13 within which a first valve housing 14 is slidably disposed.

The small diameter bore portion 13 of power piston 12 is provided with three annular grooves 16, 21 and 17 upon the inner peripheral surface thereof, and between the second annular groove 28 and the annular groove 16, and between the first annular groove 19 and the annular groove 21 are provided radially disposed passages 27 and 20, respectively, for providing fluidic communication between the two ports 29 and 18 and the small diameter bore portion 13 of the power piston 12, the annular groove 17 of the small diameter bore portion 13 of the power piston 12 similarly communicating with the large diameter bore portion 36 through means of a passage 32 provided within the power piston 12.

A guide member 71 is fixedly secured to a shoulder portion of the power piston 12, and a chamber 33 is therefore defined within the large diameter bore portion 36 of the power piston 12 between the left end of the input piston 34 and the guide member 71. The large diameter bore portion 36 of the power piston 12 is also provided with an annular groove 41, at the inner peripheral surface thereof, which fluidically communicates with an axially extending passage 42 provided within the power piston 12, and the chamber 33 of the power piston 12 and the chamber 37 of the housing 10 communicate with each other through means of passages 38, 39 and 40 provided within the input piston 34.

The small diameter bore portion 13 of the power piston 12 is also divided into two chambers 25 and 31, by means of the first valve housing 14, defined upon opposite sides thereof, chamber 25 communicating with the annular groove 16 while chamber 31 communicates with the annular groove 17. A spring 26 is disposed within chamber 31 between the guide member 71 and the right end portion of the first valve housing 14 for normally biasing the latter toward the left as viewed in the drawing.

The first valve housing 14 is provided with a central bore 23 therein which communicates with the annular groove 21 for a power piston 12 through means of a radial bore 22 provided within housing 14, and the central bore 23 of the housing 14 further communicates with chamber 25 of power piston 12 through means of an axial bore 24 provided within the left end of housing 14.

A second valve housing 15 is slidably disposed within the first valve housing 14 and is guided therein by means of a central bore of the guide member 71. This second valve housing 15 has a cylindrical bore therein, one end of which is open so as to communicate with bore 23 of the first valve housing 14 while the other end of which is closed so as to be in contact with the left end portion of the input piston 34. The second valve housing 15 is further provided with a small diameter radial orifice passage 67 which normally provides communication between the cylindrical bore of the second housing 15 and the chamber 31 of the power piston 12, and a larger diameter radial orifice passage 30 which, upon leftward movement of the second valve housing 15, provides additional communication between the cylindrical bore of the second housing 15 and chamber 31 of the power piston 12 in conjunction with the small diameter orifice passage 67.

The power piston 12 is at the left end thereof, provided with a cylindrical bore 72 and a stepped rod 45 is disposed within cylindrical bore 72, a large diameter portion 45a thereof being fixedly secured to a shoulder of the power piston 12 for reciprocation therewith.

A guide member 70 is provided within the large diameter bore portion 11 of the housing 10 at the left end of the housing 10 and is secured to the housing 10 through means of a holder 60 and a stop ring 61. A small diameter portion 45b of the stepped rod 45 is guided by means of the guide member 70 within a central bore 65 thereof, and the diameter of the small diameter portion 45b is approximately one quarter that of the power piston 12. A spring 69 is interposed between the guide member 70 and the large diameter portion 45a of the stepped rod 45 for normally biasing the latter, as well as the power piston 12, toward the right and a spring retainer 68 is provided in association with portion 45a of rod 45 for the spring 69. The guide member 70 is also provided with a radial passage 64 which communicates with port 63 of housing 10 as well as with the central bore 65.

Between the right end of the large diameter portion 45a of stepped rod 45 and the left end face of the small diameter portion 13 of the power piston 12 there is provided a valve plate 46 which has a central bore 66 provided therein for providing communication between chamber 25 of power piston 12 and a valve bore 52 of rod portion 45a. This bore 66, however, is normally blocked, and communication between chamber 25 and valve bore 52 provided within the large diameter portion 45a of the stepped rod 45 is normally interrupted, due to the disposition of a ball valve 47 within valve bore 52. The ball valve 47 is normally biased toward the valve plate 46 and its spherical valve seat by means of the biasing force of a spring 48 disposed within bore 52.

In succession to bore 52, there is also provided a central bore 50 within the small diameter portion 45b of stepped rod 45, and central bore 50 is adapted to communicate with the central bore 65 of the guide member 70. Between bores 52 and 50 there is also provided an orifice plate 49 which has an orifice 51 for providing communication between bores 52 and 50, and the orifice plate 49 also serves to support spring 48 within bore 52. The left end portion of the small diameter portion 45b of stepped rod 45 is seen to be connected with a master cylinder piston, not shown.

The axial passage 42 of power piston 12, which communicates with chamber 37 of housing 10, also communicates with chamber 43 of housing 10 through means of a plurality of circumferentially disposed, axial bores 73 provided within the large diameter portion 45a of stepped rod 45, and the chamber 43, as described hereinbefore, communicates with reservoir 5 through means of port 44 and conduit 9.

Three seal rings 56, 57 and 58 are provided between the sliding surfaces of the small diameter portion 45b of stepped rod 45 and the inner peripheral surface of guide member 70, defining bore 65, at opposite ends thereof, and similarly a seal ring 53 is also provided between the sliding surfaces of the input piston 34 and the small diameter bore portion 35 of the housing 10. A stopper ring 62 is provided within the right end of the housing 10 for preventing the input piston 34 from moving rightwardly beyond the position shown in the drawing.

Referring now especially to the hydraulic circuitry of the present invention, wherein the condition of the attached drawing shows the fluid pump 1 being normally operated by means of the vehicle engine and that of the brake pedal, not shown, being in a non-depressed state, under such conditions, fluid from pump 1 is delivered to port 18 of the booster unit 2 through means of the conduit 6, and is further fed to the power steering unit 3 through means of the housing 10 of the booster unit 2, and the conduit 7. The delivered fluid is returned therefrom to the reservoir 5 through means of conduit 8, and this circulation circuit will be explained in more detail hereinafter.

More specifically, the fluid from pump 1 is returned to the reservoir 5 through means of conduit 6, port 18 of booster housing 10, annular groove 19, radial passage 20, annular groove 21 of power piston 12, passage 22, central bore 23 and bore 24 of the first valve housing 14, chamber 25, annular groove 16, radial passage 27, annular groove 28 of power piston 12, port 29 of booster housing 10, conduit 7, power steering unit 3, and conduit 8. In addition to this return circuit, the fluid fed from the pump 1 to the central bore 23 of the first valve housing 14 is partially, approximately five percent of the total flow, returned to the reservoir 5 through means of another route or path, that is, through means of the cylindrical bore and the small orifice passage 67 of the second valve housing 15, chamber 31, annular groove 17, passage 32, chamber 33, annular groove 41, axial passage 42 of power piston 12, the passages 73 of the large diameter portion 45a of stepped rod 45, chamber 43, port 44 of housing 10, and conduit 9. It is also noted that the fluid within chamber 33 of power piston 12 is also delivered to chamber 37 of booster housing 10 through means of passages 40, 39 and 38 of the input piston 34.

A pressure difference is thus generated between chambers 25 and 31 of the power piston 12, upon opposite sides of the orifice passage 67, however, since the pressure increase within chamber 25 is compensated for by means of the biasing force of spring 26, the first valve housing 14 is maintained at the position shown within the drawing in spite of such pressure difference. Thus, communication between the annular groove 16 and chamber 25, as well as between annular groove 17 and the chamber 31, is maintained.

Under such normal conditions, when the brake pedal, not shown, is depressed so as to supply brake pressure to the wheel brake means, also not shown, the input piston 34 is moved toward the left so as to interrupt the fluid communication between chamber 33 and annular groove 41. The pressure between chambers 25 and 31 is now equalized due to the pressure increase within chamber 31, and therefore, the first valve housing 14 is moved toward the left by means of the force of spring 26 so as to throttle the fluidic communication between annular groove 16 and chamber 25. This throttling causes an increase in the pressure within the chambers 25, 31, 33 and 37, and consequently, a pressure difference between chambers 25 and 31 is once again generated due to the increase in pressure within chamber 25. It is noted that the equalization of the pressures within chambers 25 and 31 occurs only momentarily.

Thus, the generated pressure difference is maintained in such a manner that the increase in pressure within chamber 25 is again compensated for by means of the biasing force of spring 26, and consequently, the fluid supply to chamber 37 is determined by means of the orifice passage 67. More specifically, assuming that the amount of fluid flow into chamber 37 is Q, and that the pressure difference between chamber 25 and 31 is $\Delta P$, and also that the effective area of the orifice passage 67 is A, then the following formula is presented:

$$Q \alpha \sqrt{\Delta P \cdot A} \qquad (1)$$

wherein $\Delta P$ is assumed to be constant due to the biasing force of spring 26, as described hereinabove, and accordingly, the amount of fluid flow Q is defined by the area A of the orifice passage 67.

Under these conditions when the input piston 34 is further moved toward the left, due to a further rapid depression of the brake pedal, not shown, the second valve housing 15 is also removed toward the left so as to establish communication between chambers 25 and 31 through means of the orifice passage 30, in addition to the orifice passage 67, in order to increase the fluid flow into chamber 37, and at this time, the communication between the annular groove 16 and the chamber 25 is also blocked. Thus, the pressure within chamber 37 is further rapidly increased so as to move the power piston 12, as well as the stepped rod 45 secured thereto, toward the left against the biasing force of the spring 69 and the sliding resistance force of the seals 56-58. Such leftward movement of the stepped rod 45 will in turn move the piston of the master cylinder, not shown, so as to actuate the wheel brake means, also not shown. The driver of the vehicle, during this braking operation, will receive a reaction force, which corresponds to the pressure within chamber 37, from the left end face of the input piston 34, and thus the pressure generation can be realized.

During such braking operation, when the pressure within chamber 37 becomes sufficiently high enough for actuating the brake means, the large amount of fluid flow from both orifice passages 67 and 30 into chamber 37 may no longer be needed. In this case, the first and second valve housings 14 and 15, as well as the input piston 34, are moved toward the right, relative to the power piston 12, that is, such elements stop moving with the power piston 12 and only the power piston 12 continues through a slight leftward movement.

In more detail, the relative movement of the second valve housing 15 causes the fluidic communication, between chambers 25 and 31, through orifice passage 30 to be terminated and this termination of communication, as a result of the closure or blockage of orifice passage 30, will serve to move the first valve housing 14 relative to the power piston 12 so as to re-establish the communication between chamber 25 and the annular groove 16, while the relative movement of the input piston 34 causes a slight re-establishment of the communication between chamber 33 and annular groove 41 for throttling the communication therebetween.

It is also to be noted that in case the accumulator pressure is not sufficiently accumulated within accumulator 4, the ball valve 47 will be moved toward the left so as to establish communication between chamber 25 and the bore 52 within the large diameter portion 45b of the stepped rod 45 as a result of the pressure within chamber 25, and it is to be further appreciated that this operation is performed only when the fluid within chamber 25 is highly pressurized, such as for example, during power steering and/or braking operations. Consequently, the pressure within accumulator 4 is always maintained as its operative level.

Assuming now that the brake booster is not actuated and that the power steering unit is actuated in lieu thereof, then the fluid pressure within chamber 25 is increased so as to move the first valve housing 14 toward the right from the position shown in the drawing, and communication between annular groove 17 and chamber 31 is thus throttled by means of the right end face of the first valve housing 14. At this time, however, the pressure difference between chambers 25 and 31 is compensated for by means of the biasing force of spring 26, and therefore, such pressure difference is maintained constant so as to hold the first valve housing 14 at a position defined by the amount of fluid flow through the orifice passage 67.

When the brake pedal is then depressed during operation of the power steering unit, the input piston 34 is moved toward the left terminating the fluidic communication between annular groove 41 and chamber 33 and thereby generating pressure within chamber 37 as well as chamber 33. After a further leftward movement of the input piston 34, the second valve housing 15 is also moved toward the left so as to establish communication between the chambers 25 and 31 through means of the orifice passage 30, as well as passage 67, and consequently, the power piston 12 is moved toward the left so as to actuate the master cylinder as a result of the further pressure increase within chamber 37.

When the increased pressure within chamber 37 becomes greater than the pressure within chamber 25, the latter pressure corresponding to the pressure utilized within the power steering operation, the first valve housing is moved toward the left so as to throttle the communication between chamber 25 and annular groove 16 in order to avoid surplus pressure being applied to the power steering unit. Consequently, this pressure change may be performed solely as a result of the movement of the first valve housing 14 without any influence upon the operator of the vehicle, and thus, a comfortable brake operation is imparted to the operator.

Considering now the condition wherein the fluid flow from pump 1 is insufficient for braking the wheels during a braking operation, such as for example, when the pump is defective in some manner, then the input piston 34 is moved toward the left so as to move the second valve housing 15 into contact with the first valve housing 14, and the same is moved further toward the left together with the two valve housings 14 and 15. A projection 14a, provided at the left end of the first valve housing 14, will then directly push the ball valve 47 toward the left so as to establish the fluidic communication between bore 52, of the large diameter portion 45a of the stepped rod 45, and chamber 25.

Thus the high pressure fluid accumulated within accumulator 4 is able to flow into chamber 37 through means of the passages 64, 65, 50, 52, 66, chamber 25, passage 24, orifices 67 and 30, chamber 31, passage 32, chamber 33, and input piston passages 40, 39 and 38.

In this manner high pressure fluid is fed into chamber 37 so as to move the power piston 12 and the stepped rod 45 toward the left in order to actuate the master cylinder.

Assuming now that the diameter of the power piston 12 is D and that of the small diameter portion 45b of the stepped rod 45 is D/4, then the cross-sectional diameters of the seals sufficient enough to seal the respective pistons 12 and 45b are d and 2/3d in case the high pressures are assumed to be applied along the sliding surfaces thereof.

The sliding resistance force F, characteristic of the above two cases, may be represented as follows:

$$F \alpha P \cdot d \cdot D N \cdot n \qquad (2)$$

$$F \alpha P \cdot 2/3 \, d \cdot 1/4 \, D \cdot N \cdot n \qquad (3)$$

wherein:
P is the fluid pressure applied to the pistons
N is the coefficient of friction between the sliding surfaces, and
n is the number of seal rings.

Therefore, the sliding resistance force exerted upon the small diameter portion 45b of the stepped rod 45 will be reduced to about one-sixth compared with the case wherein the high pressure is applied to the power piston 12. This will result in good sealing properties of the seals, in addition to economization thereof by reducing the size of the seals.

Furthermore, by decreasing the sliding resistance, the manual force, such as for example, the brake pedal depression force, sufficient for generating the master cylinder pressure, may be considerably decreased, which will impart more satisfactory operations to the driver of the vehicle during brake operations.

The method of introducing an accumulator pressure into the booster housing in the present embodiment is shown only for an emergency circuit, however, this is readily modified for a closed center type, such as for example, as may be seen from the attached drawing, the fluid pump 1, the hydraulic circuit connected thereto, especially conduit 6, port 18, groove 19, passage 20, and groove 21, the power steering unit 3, and the circuit connected thereto, including conduits 7 and 8, port 29, groove 28, passage 27 and groove 16, may be deleted, and in lieu thereof, another pump may be added so as to be connected with the accumulator 4 and the conduit 9. Within this modification, when the input piston 34 is moved toward the left for the braking operation, communication between chamber 37 and annular groove 41 is interrupted, and further leftward movement of input piston 34 causes the first and second valve housings 14 and 15 to move toward the left. This leftward movement of the first valve housing 14 will cause the ball valve 47 to be unseated by means of the projection 14a of the housing 14, and thus, the pressurized fluid within the accumulator 4 is able to be fed to chamber 37 through means of the chambers or passages 64, 65, 50, 51, 52, 66, 24, 23, 67, 30, 31, 32, 33, 40, 39, and 38 so as to move the power piston 12 toward the left.

Obviously, many modifications and variations of the present invention are possible in light of the above teachings. It is to be understood therefore that within the scope of the appended claims, the invention may be practiced otherwise than as specifically described herein.

What is claimed as new and desired to be secured by letters patent of the United States is:

1. A hydraulic brake booster comprising:
   a fluid pressure source;
   a booster having a bore therein;
   steped power piston means, slidably disposed within said bore of said booster housing, operatively connected at one end thereof with a master brake cylinder means and forming at the other end thereof a fluid chamber the hydraulic fluid pressure of which actuates said power piston means for in turn actuating said master cylinder means;
   a guide member provided within said bore of said booster housing at the opposite side of said fluid chamber for guiding the sliding movement of a small diameter portion of said stepped power piston means;
   first fluid passage means provided within said guide member and said small diameter portion of said stepped power piston means, one end of said first fluid passage means being fluidically communicated with said fluid pressure source;
   second fluid passage means, one end of which fluidically communicates with the other end of said first fluid passage means and the other end of which communicates with said fluid chamber within said bore of said booster housing;
   third fluid passage means, one end of which communicates with said fluid chamber, and said third fluid passage means further communicating with a fluid reservoir;
   a first valve interposed between said first and second passage means and normally blocking communication therebetween;
   a second valve interposed between said fluid chamber and said third fluid passage means and normally permitting communication therebetween; and
   input piston means slidably disposed within said bore of said booster housing actuated by a manual brake means, said input piston means being operatively connected with said first and second valves for actuating them during a braking operation.

2. A hydraulic brake booster according to claim 1 wherein said first fluid passage means comprises:
   an inlet port provided upon said booster housing for communicating with said fluid pressure source;
   a radial passage provided within said guide member for communicating with said inlet port;
   a central bore provided within said guide member for communicating with said radial passage and also for receiving therein said small diameter portion of said stepped power piston means; and
   an elongated bore provided within said small diameter portion of said stepped power piston means for communicating with said central bore of said guide member.

3. A hydraulic brake booster according to claim 2, wherein:
   said second fluid passage means is provided within a large diameter portion of said stepped power piston means and within said input piston means.

4. A hydraulic brake booster according to claim 3, wherein said third fluid passage means comprises:
   an axial bore provided within said large diameter portion of said stepped power piston means and communicating with said second fluid passage means through said second valve;
   a chamber formed within said bore of said booster housing at the opposite side of said fluid chamber; and
   an outlet port provided within said booster housing and communicating with said reservoir.

5. A hydraulic brake booster according to claim 1, wherein:
   said first valve is located between said small and large diameter portions of said stepped power piston means for normally preventing communication between said first and second fluid passage means; and said second valve is located between said large diameter portion of said stepped power piston means and said input piston means for normally allowing communication between said fluid chamber and said third passage means.

6. A hydraulic brake booster according to claim 5, wherein said second fluid passage means comprises:
   a cylindrical bore provided within said large diameter portion of said stepped power piston means; and
   a passage provided within said input piston means for providing communication between said cylindrical bore and said fluid chamber.

7. A hydraulic brake booster according to claim 6, wherein:
   said input piston means is slidable within said cylindrical bore of said second fluid passage means.

8. A hydraulic brake booster according to claim 7, wherein:
   said first and second valves are actuated during the sliding movement of said input piston means into said cylindrical bore of said second fluid passage means.

9. A hydraulic brake booster comprising:
   independent first and second pressure sources;
   a booster housing having a bore therein;
   a stepped power piston means, slidably disposed within said housing bore, operatively connected at one end thereof to a master brake cylinder means and forming at the other end thereof a first fluid chamber the hydraulic fluid pressure of which actuates said power piston means for in turn actuating said master cylinder means;
   a first valve housing slidably disposed within a cylindrical bore provided within said stepped power piston means;
   a second valve housing slidably disposed within a cylindrical bore provided within said first valve housing;
   a normally open valve provided between said first fluid chamber and a return circuit for normally allowing fluidic communication therebetween;
   an input piston connected with a manual brake means and further operatively connected with said first and second valve housings and said normally open valve for controlling the same upon actuation of said manual brake means;
   said fluid passage means connecting said first fluid pressure source with a fluid operated device through said first valve housing;
   second fluid passage means connecting said first fluid pressure source with said first fluid chamber through said first and second valve housing;
   said first valve housing being slidable within said power piston means for controlling the fluid flow within said first or second fluid passage means in accordance with the pressure difference between second and third fluid chambers formed at both sides thereof;

said second valve housing being slidable within said first valve housing for controlling the communication between said first and second fluid passage means and for controlling the fluid supply from said first fluid pressure source into said second fluid chamber of said second passage means;

said normally open valve being cooperative with said second valve housing for controlling the communication between said first fluid chamber and said return circuit;

third fluid passage means provided within said small diameter portion of said stepped power piston means and communicating with said second fluid pressure source; and a normally closed valve provided between said third fluid chamber of said first fluid passage means and said third fluid passage means, said normally closed valve being actuated by said first valve housing upon failure of said first fluid pressure source.

* * * * *